United States Patent [19]

Tibbals, Jr.

[11] Patent Number: 4,715,249

[45] Date of Patent: Dec. 29, 1987

[54] SPEED CHANGE DEVICE

[76] Inventor: Edward C. Tibbals, Jr., 2216 Guilford College Rd., Jamestown, N.C. 27282

[21] Appl. No.: 901,183

[22] Filed: Aug. 28, 1986

[51] Int. Cl.$^4$ .......................... F16H 1/28; F16H 13/06
[52] U.S. Cl. .......................................... 74/800; 74/798
[58] Field of Search .............................. 74/800, 798, 60

[56] References Cited

U.S. PATENT DOCUMENTS

| 3,139,771 | 7/1964 | Maroth | 74/800 |
| 3,590,659 | 7/1971 | Maroth | 74/800 |
| 4,041,808 | 8/1977 | Fickelscher | 74/800 |
| 4,563,915 | 1/1986 | Tibbals, Jr. | 74/800 |
| 4,620,457 | 11/1986 | Distin et al. | 74/800 |

FOREIGN PATENT DOCUMENTS 2117474  10/1983  United Kingdom ................. 74/800

Primary Examiner—Allan D. Hermann
Assistant Examiner—Dirk Wright

[57] ABSTRACT

A speed change device that includes an annular ring journaled on the periphery of a swash plate having a plurality of equally spaced radially extending frustoconical rollers on the periphery thereof adapted to intermittently engage a selectively shaped fixed race and a selectively shaped movable race at low pressure angles with attendant low normal forces.

17 Claims, 5 Drawing Figures

SPEED CHANGE DEVICE

This invention relates to speed change gearing systems and particularly to improved constructions for rolling contact, torque transmitting speed change assemblies, such as speed reducers, speed increasers and the like.

The minimization of friction and the total elimination of backlash in speed change gearing systems, and particularly for high ratio transmission gearing systems, have been long sought and continuing objectives in this art. One broad approach to such ends has been the employment of rolling contact instead of sliding contact between the gearing elements. One avenue of effort to further such preferential utilization of rolling contact has been the employment of eccentric nutating elements and one or more sets of rollers which engage cycloidal or trochoidal races to attempt to maintain continuous rolling contact between the nutating element and a stationary race. Illustrative of recent efforts in this area are SM-CYCLO speed reducers as manufactured and sold by the Sumitomo Machinery Corporation of America of Teterboro, N.J., the DOJEN rotary actuators made and sold by Dolan-Jenner Industries of Woburn, Mass., and the ANTIFRICTION DRIVE speed reducers of Advanced Energy Technology, Inc. of Boulder, Colo. All of these constructions include a pair of relatively gently undulating race surfaces of cycloidal or trochoidal character interacting with a plurality of interposed rolling elements that are disposed in continuous contact with both of the gently undulating surfaces. Such constructions all require that the rolling elements sequentially roll over the troughs and the crests of the cyloidal races. Such geometric limitations, which are inherent in this particular rolling contact type of approach, operate to limit the amplitude of the cycloidal or trochoidal race patterns to that of the above noted gently undulating character. The practical effect of such inherently limited race amplitude, when viewed in light of the circumferential period, results in the entire rolling contact surface on both the driving and the driven race elements inherently contacting the rollers at high pressure angles. Such high pressure angle contact inherently produces high normal forces at the contact points on the race surfaces throughout the entire circumferential path. The presence of such high normal forces, whose magnitude varies with the applied torque, serves to produce localized deformation of the rolling elements with an accompanying introduction of localized sliding contact rather than pure rolling contact, as well as high Hertz stresses with an accompanying advance of fatigue failure. As is apparent, such problems attendant high normal forces are accentuated as the transmitted torque increases and cumulatively result in loss of continuous rolling contact and in significant decreases in operating efficiency.

A variant of the foregoing approach, utilizing a wobble plate instead of a nutating element and balls instead of rollers, was suggested in my earlier U.S. Pat. No. 4,563,915. In this construction however, as was the case with the above mentioned units, the amplitude of the crests of the undulations in the races is inherently limited by the fact that when any rolling element simultaneously contacts the trough portion of the two races, the immediately adjacent peak or crest portions of the races must not engage each other and must be separated by a distance sufficient to accommodate the interposition of the retainer spacer element between the balls. Such limited amplitude for the undulating races again inherently results in high pressure angles and high normal forces with the operational disadvantages attendant thereto as described above.

This invention may be briefly described as an improved construction for speed change devices which includes, in its broad aspects, an annular ring journaled on the periphery of a driven swash plate having a plurality of radially extending frusto-conical rollers on the periphery thereof, a fixed race and a movable race positioned to be intermittently engaged by such frusto-conical rollers at low pressure angles with attendant low normal forces. In a narrower aspect, the subject invention includes a fixed race element having a first predetermined number of peripheral tooth-like crests intermittently and sequentially engageable by said frusto-conical rollers, a rotatable race element having a second predetermined number of peripheral tooth-like crests also intermittently and sequentially engageable by the frusto-conical rollers with said first and second number of crests being different from each other and either equaling the number of frusto-conical rollers or differing from the number of said rollers by one. In a still narrower aspect the subject invention includes fixed and rotatable race element configurations characterized by extending equally spaced tooth-like crests separated by recesses having defining side walls disposed parallel to the surfaces of said swash plate mounted conical rollers and wherein such recesses are selectively contoured to provide low pressure angle contact with the rollers and to effectively preclude high pressure angle roller contact therewith.

Among the advantages attendant the practice subject invention is the provision of an improved construction for single stage, high ratio speed change devices capable, for example, of ratios as high as 600 to 1 attended with zero backlash and a smooth velocity output. Other advantages include the provision of a speed change device construction characterized by markedly high efficiency attained through pure rolling contact, low inertia and by low pressure angle contact effectively independent of the magnitude of the transmitted torque; reduced rolling contact Hertz stresses with an attendant increased operating life and reduced component size. As will become more apparent to those skilled in this art, such advantageous characteristics of the herein disclosed construction have appreciable utility in the field of robotics, multi-axis rotary table displacement for machine tools, irrigation system drives and many other types of drive and positioning systems.

The primary object of this invention is the provision of an improved construction for speed change devices.

A further object of this invention is the provision of a high efficiency rolling contact type of speed change device characterized by arbitrarily small pressure angles and consequent low normal forces.

Still another object of this invention is the provision of an improved rolling contact speed change device that operates without backlash and at effectively high and constant efficiency independent of varying torque loads.

Other objects and advantages of the subject invention will become apparent from the following portions of this specification and from the appended drawings which illustrate, in accord with the mandate of the patent statutes, presently preferred embodiments of speed change devices that incorporate the principles of this invention.

Referring to the drawings.

Figure 1:
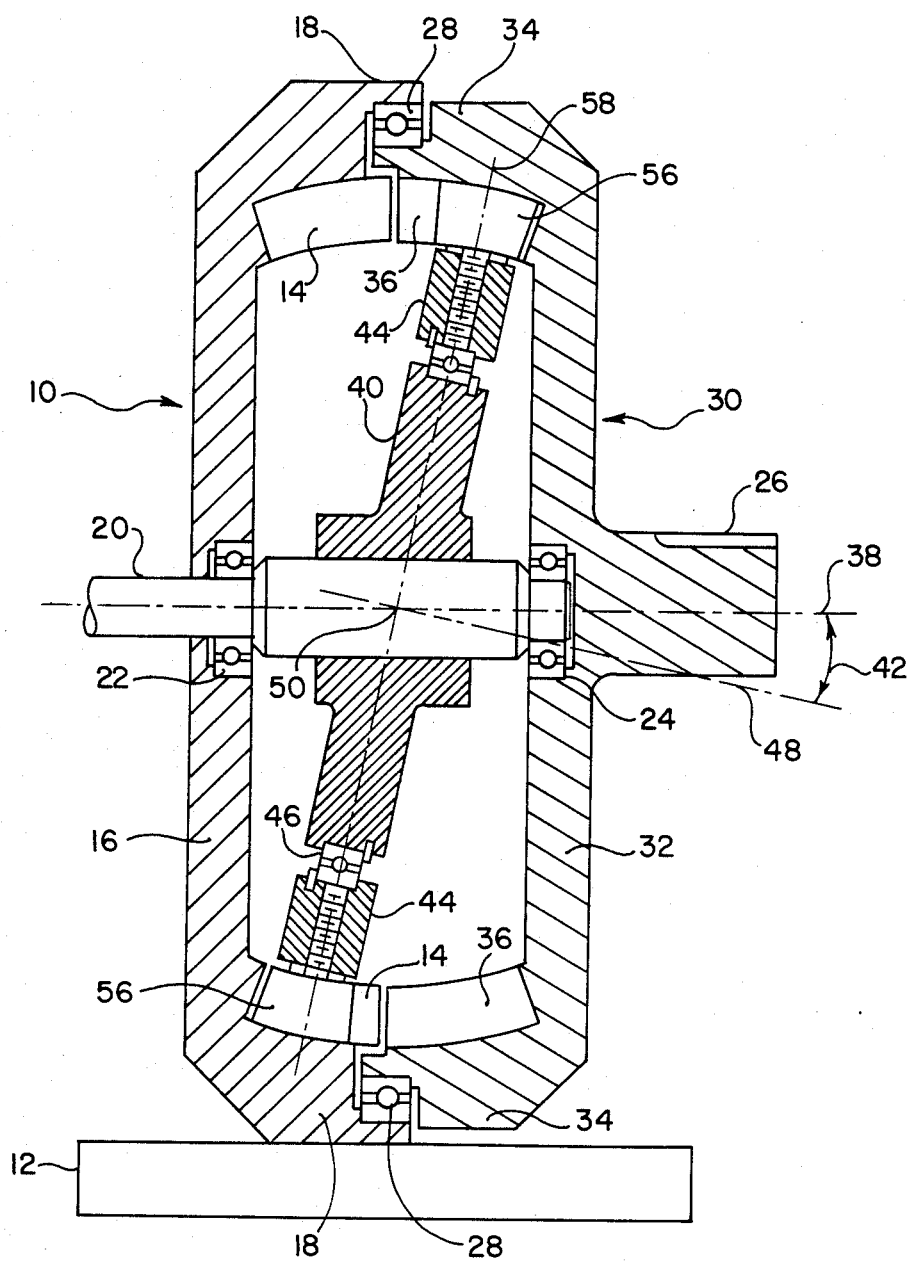
FIG. 1 is a schematic sectional view of a speed change device constructed in accord with the principles of this invention.

Referring to the drawings and initially to FIGS. 1-3, there is schematically depicted the elements of a first construction for an improved speed change device that incorporates the principles of this invention and in which the fixed and rotatable race elements are disposed in adjacent and generally parallel relation on the surface of a common sphere having its center on the hereinafter defined "center of rotation" for the device. To such end, there is provided a stationary housing element 10 mounted on a base 12 or other fixed site. Such stationary housing element 10 may suitably comprise a planar base portion 16 of circular configuration having an annular perimetric flange 18 extending from the marginal edge thereof. Disposed on the interior surface of such perimetric flange 18 is a fixed race means, generally designated 14.

Disposed in adjacent facing relation with the stationary housing element 10 is a rotatable housing element 30 of generally complemental configuration. Such rotatable housing element 30 may suitably comprise a planar base portion 32 of circular configuration having an annular perimetric flange 34 extending from the marginal edge thereof. Disposed on the interior surface of perimetric flange 34 is a rotatable race means, generally designated 36. As is apparent from FIG. 1, the fixed and rotatable race means 14 and 36 are positioned in essentially side by side relation and have a common longitudinal axis 38 and, as mentioned above, are disposed in generally parallel relation on the surface of a common sphere having its center on the "center of rotation" for the device. The terminal ends of the extending flange portions 18 and 34 of the stationary housing element 10 and rotatable housing element 30 are appropriately recessed and interconnected by an interposed ball bearing 28, suitably an "X" contact type bearing, in such manner as to permit free rotatable displacement of housing element 30 relative to fixed housing element 10.

Coaxially aligned with the common longitudinal axis 38 is an input drive shaft 20 rotatably supported by antifriction bearings 22 and 24 that are suitably mounted in the planar base portions 16 and 32 of the fixed and rotatable housing elements 10 and 30 respectively. Such illustrated mounting for the drive shaft 20 permits rotation thereof independent of both the fixed and rotatable housing elements and readily permits connection thereof to a torque producing power source. Mounted on the rotatable housing element 30 in coaxial alignment with the common longitudinal axis 38 is an output stub shaft 26 or other power take-off means adapted to be rotatably displaced in conjunction with the displacement of the rotatable housing element 30.

A swash plate 40 is mounted on the input drive shaft 20 at a predetermined angle of inclination 42 with respect to the longitudinal axis 38 so as to rotate in conjunction therewith. As is well known, rotation of the swash plate 40 will cause a point on the periphery thereof to follow a sinusoidal path as it is displaced through 360°. An independently rotatable annular ring member 44 is journaled on the periphery of the swash plate 40, preferentially by the interposition of an "X" contact type of ball bearing 46 therebetween. The axis of rotation 48 of the ring member 44 intersects, as does the axis of rotation of the swash plate 40, the axis of rotation 38 of the input drive shaft 20 at a common point, herein termed the "center of rotation" 50.

Mounted on the periphery of the independently rotatable ring member 44 are a plurality of equally spaced, radially extending and freely rotatable frusto-conical stub rollers 56. The axes of rotation 58 of such frusto-conical rollers 56 intersect the center of rotation 50 and such rollers are shaped so that the extension apices of the exterior surfaces thereof are each coincident with such center of rotation 50.

Figure 3:
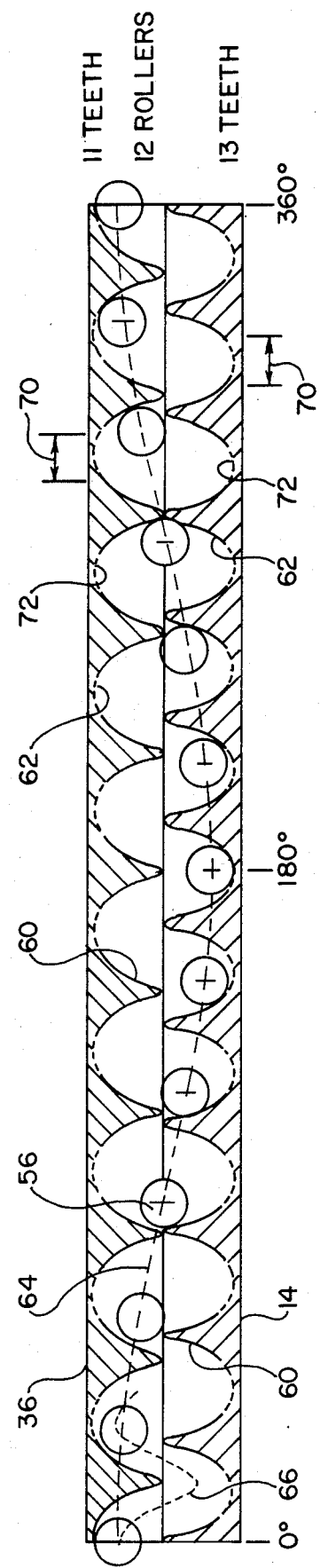
FIG. 3 is a mercator development of the fixed and rotatable race configurations included in the device of FIGS. 1 and 2.

FIG. 3 is a mercator type development showing the surface configuration of the fixed and rotatable race means 14 and 36, as well as indicating the positioning of the frusto-conical rollers 56 relative thereto, for an exemplary device that includes 11 teeth in the rotatable race 36, 13 teeth in the fixed race 14 and 12 frusto-conical stub rollers 56 mounted on the ring member 44. As generally indicated thereon by the dotted line 64, the path taken by a particular point on the periphery of the ring member 44, such as the axis of rotation of one of the frusto-conical rollers 56, during a 360° revolution of the input shaft 20, is a sinusoid. As also indicated thereon, the path taken by the axis of rotation of each of the frusto-conical rollers 56 as they interfacially engage and travel along the races is a compressed sinusoid, as depicted by the dotted line 66, and in which roller contact with each race is intermittent and hence of discontinuous character. Each race pattern is formed of a plurality of equally spaced sharp tooth-like crests 60 separated by a recessed portion 62, with each of the latter defining a surface that is adapted to be disposed in effectively continuous interfacially engaged relation with the external surfaces of the frusto-conical rollers 56 to uniformly apportion the loading thereon. The composite shape of each such recessed portion is essentially the summation of curves that are parallel with and uniformly spaced from the sinusoidal path 66 taken by the axis of rotation of the conical rollers 56. Such shape provides large surface areas having a slope characterized by low pressure angle contact with the rollers 56.

In a preferred embodiment, the base of the recessed portions 62 intermediate the tooth-like crests 60 are relieved over those areas where, as generally indicated at 70, the pressure angle markedly increases. Such relief involves a deepening of the base of the recessed portions, as generally indicated by the dotted lines 72, to effectively minimize, if not eliminate, interfacial contact between the surface of the frusto-conical rollers 56 with the race surfaces at such locations.

As evidenced by the illustrated and above described system geometry, the angle of swash plate inclination, through which the drive rollers 56 undulate, is selectively chosen so as to effect a spherical path amplitude which approximates the circumferential crest to crest distance around the races and which amplitude is much larger than was heretofore possible with the cycloidal and trochoidal type devices of the prior art as noted above or of the wobble type axial speed reducer apparatus of the type described in my earlier U.S. Pat. No. 4,563,915. In conjunction with the foregoing it should be noted that the diameter of such frusto-conical rollers 56 should be selected so that it does not cut off or truncate a significant portion of the desirable high slope surfaces adjacent the tooth crests on the races.

In the operation of the above described device, the frusto-conical rollers stub 56 will be advanced an integral fraction of a revolution for every 360° rotation of the input shaft 20. This angular advance or regression of the ring member 44 with respect to the stationary housing element 10 is, for each revolution of the input shaft 20, equal to 360° divided by the number of rollers. The fixed race 14 forces the drive rollers 56 and the ring 44 to rotate at a speed which is equal to the input shaft speed divided by the number of rollers 56 employed. If the number of tooth-like crests or teeth 60 in the stationary race 14 is one more than the number of rollers 56, then the ring 44 will regress. In contradistinction thereto if the number of such tooth-like crests or teeth 60 is one less than the number of rollers 56, then the ring 44 will advance.

Figure 2:
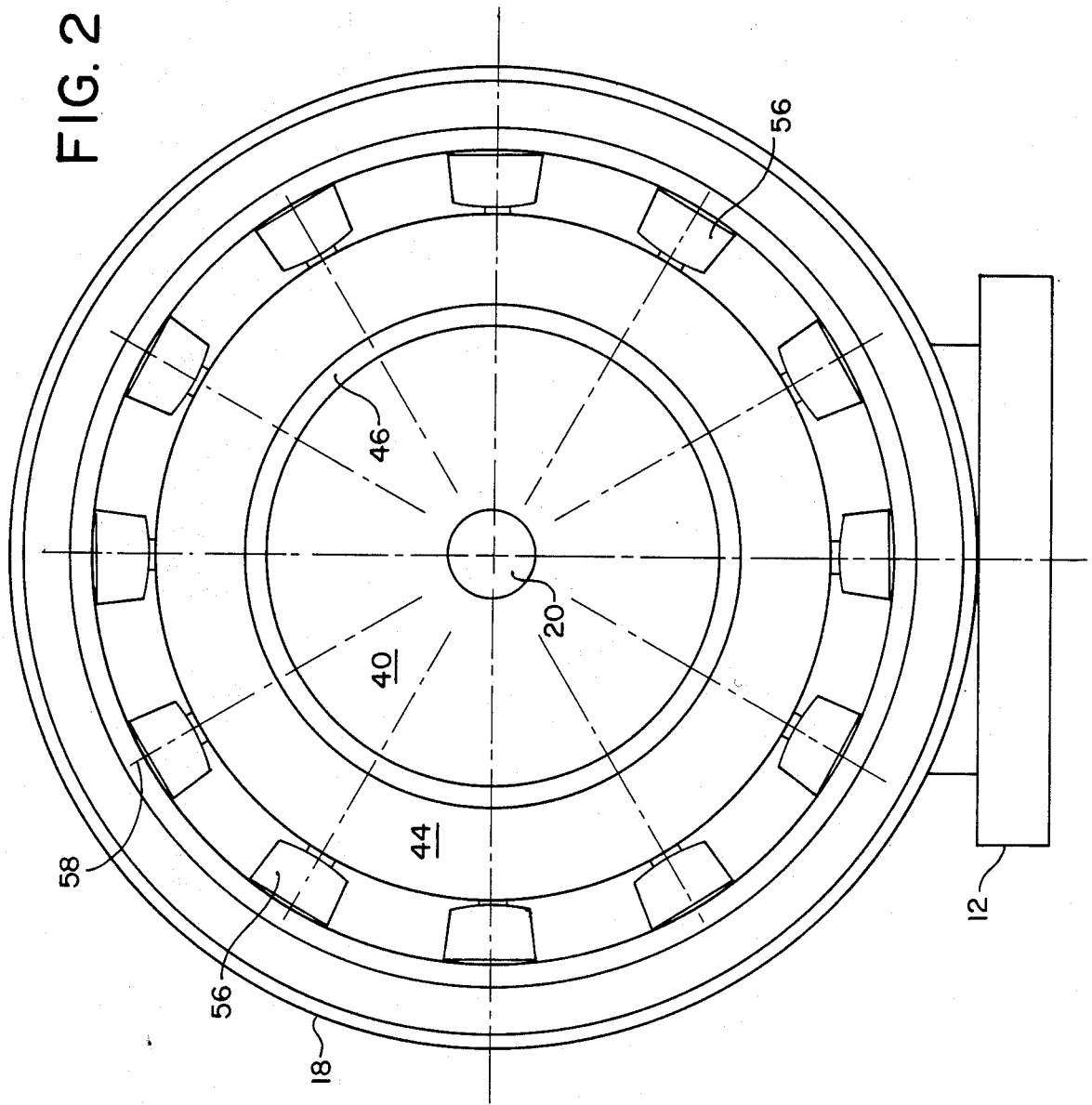
FIG. 2 is a elevational view as taken generally from the right side of FIG. 1, and with the movable housing element removed.

The following table summarizes the permutations that are available in the practice of the above described FIG. 1 embodiment.

TABLE 1

| Teeth on Fixed Race | Teeth on Output Race | Ratio | Relative Output Rotation |
|---|---|---|---|
| N | N + 1 | −N + 1 | Opposite |
| N + 1 | N − 1 | −1/(1/N + (1/(N − 1))) | Opposite |
| N − 1 | N + 1 | 1/(1/N + (1/(N + 1))) | Same |
| N | N − 1 | N − 1 | Same |
| N + 1 | N | −N | Opposite |
| N − 1 | N | N | Same |

Where N = Number of rollers
(Note: Ratio expressions have not been algebraically simplified to show additive operation of these devices.)

As will now be apparent to those skilled in this art, the above Table I tabulates the permutations available in the FIG. 1 type embodiment that employ both a fixed and rotatable race in association with a rotatable ring 44. In a somewhat broader aspect however, limited advantages attendant utilization of the principles underlying this invention could be obtained by dispensing with the movable cam track and associated rotatable housing element 30 and utilizing only the fixed race 14 and roller carrying ring 44 to effect a speed change. In such instance, an appropriate power take off from the ring 44, such as an extending conical spider or the like, would be employed.

Figure 4:
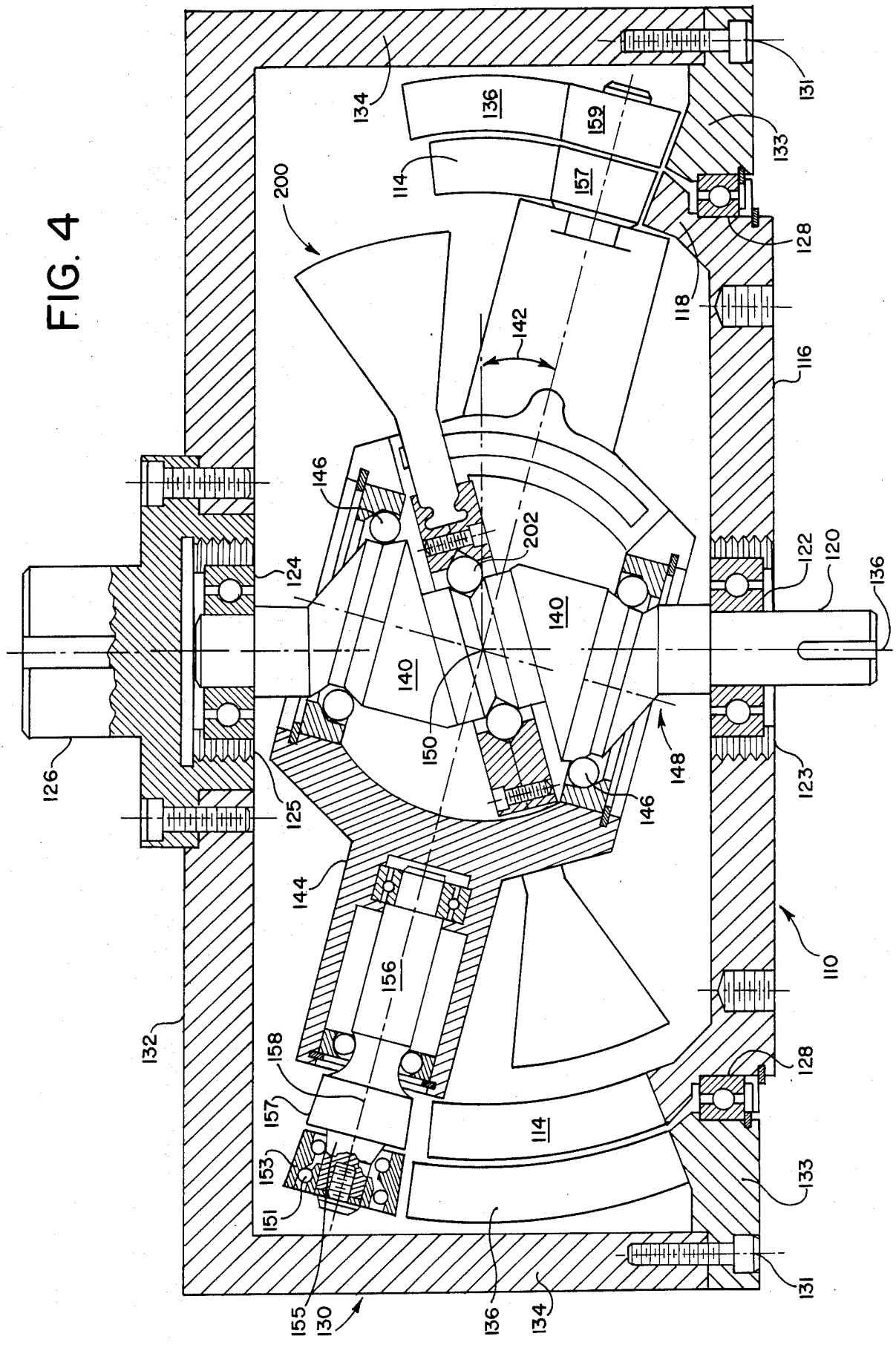
FIG. 4 is a schematic side elevation, partly in section of an alternative construction for a speed change device that incorporates the principles of this invention.

FIG. 4 illustrates an alternative and presently preferred construction for a speed change device incorporating the principles of this invention and which provides differential action between the fixed and rotatable race elements. In this embodiment, the fixed and rotatable race elements are in a generally nested coalignment as could result from disposition on the surfaces of concentric spheres having a common center on the "center of rotation" as defined above. There is here provided a stationary housing element 110 suitably comprising a planar base portion 116 of circular configuration having an annular perimetric flange 118 extending from the marginal edge thereof. Disposed on the interior surface of such perimetric flange 118 is a fixed race means, generally designated 114.

Disposed in generally encircling relation with the stationary housing element 110 is a rotatable housing element 130 of generally cylindrical box-like configuration and having a common longitudinal axis 138 therewith. Such rotatable housing element 130 may suitably comprise a planar base portion 132 of circular configuration having an elongate perimetric flange 134 extending from the marginal edge thereof. Secured, as by bolts 131, to the end of flange 134 is an annular plate member 133 having rotatable race means, generally designated 136, directed inwardly therefrom and disposed in nested coalignment or parallel overlying relation with the fixed race element 114 as would result from their disposition on the surfaces of concentric spheres having a common center coincident with the "center of rotation" for the device.

Disposed intermediate the outer marginal edge of the base portion 116 of the stationary housing element 110 and the rotatable annular plate member 133 is a ball or roller bearing 128 which permits free rotatable displacement of housing element 130, annular plate member 133 and race means 136 relative to stationary housing 110 and fixed race means 114.

Coaxially aligned with the common longitudinal axis 138 is an input drive shaft 120 rotatably supported by antifriction bearings 122 and 124 suitably mounted in adjustable sleeve 123 and 125 in the planar base portions 116 and 132 of the fixed and rotatable housing elements 110 and 130 respectively. Such illustrated mounting for the drive shaft 120 permits rotation thereof independent of both the fixed and rotatable housing elements and readily permits connection thereof to a torque producing power source. Mounted on the rotatable housing element 130 in coaxial alignment with the common longitudinal axis 138 is an output stub shaft 126 or other power take-off means adapted to be rotatably displaced in conjunction with the displacement of the rotable housing element 130.

In this embodiment the drive shaft 120 includes an enlarged and angularly offset or inclined center portion 140 that is disposed at a predetermined angle of inclination 142 with respect to the longitudinal axis 138, and which serves as a swash plate.

As independently rotatable annular ring member 144 is journaled on the periphery of the angularly offset center portion 140 of the drive shaft 120 as by the interposition of a pair of ball bearings 146 therebetween. The axis of rotation 148 of the ring member 144 intersects the axis of rotation 138 of the input drive shaft 120 at the center of rotation 150, in the manner described earlier in conjunction with the FIG. 1 embodiment.

Mounted on the periphery of the independently rotatable ring member 144 are a plurality of equally spaced, radially extending and freely and independently rotatable pin members 156. The axes of rotation 158 of such pin members 156 intersects the center of rotation 150. The upper portion of each of the pin members 156 is in the shape of a frusto-conical roller 157 positioned to intermittently engage the fixed track means 114. Each of the pin members 156 includes a shaft portion 155 extending radially beyond the roller portion 157. Mounted on said shaft portion 155 is a second frusto-conical roller 159 in the form of sleeve 153 with ball bearings 151 interposed therebetween. The roller 159 is positioned to intermittently engage the rotatable track means 136.

As will be apparent, the rollers 157 and 159 are independently and freely rotatable and share a common axis of rotation 158. The rollers 157 and 159 are shaped to provide a common frusto-conically shaped exterior surface, the exterior apices of which are each coincident with such center of rotation 150.

The angularly offset center portion 140 of the drive shaft 120 also rotatably supports a counter balance assembly generally designated 200, that is rotatable in conjunction with the ring member 144 and independent of the drive shaft 120 rotation through the interposed ball bearing 202. As shown the angle of offset for the counter balance assembly 200 is equal and opposite to the angle of offset of the ring member 144 relative to the longitudinal axis 138.

Figure 5:
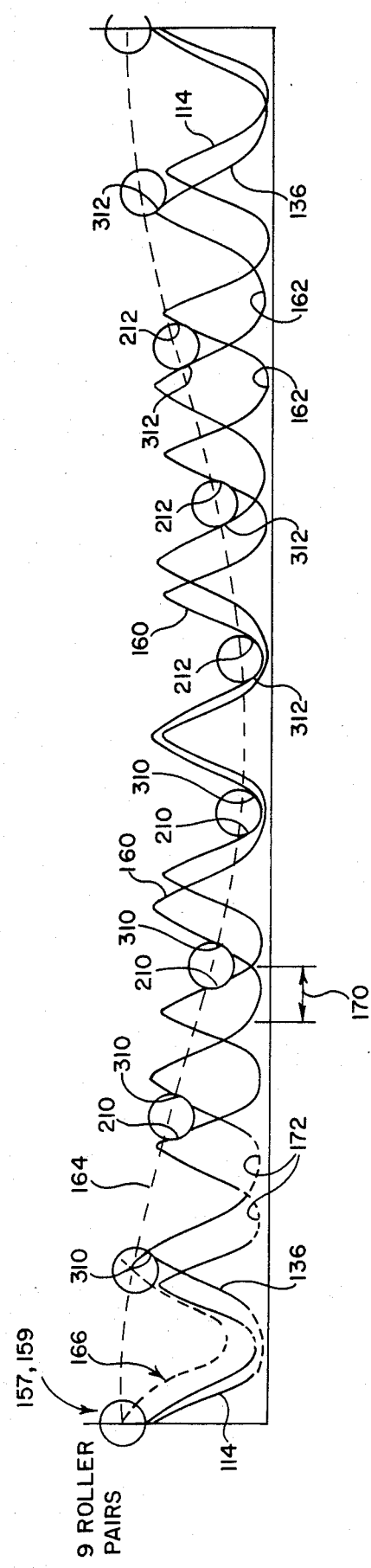
FIG. 5 is a schematic mercator development of the fixed and rotatable race configurations included in the device of FIG. 4.

FIG. 5 is a schematic mercator type development showing the surface configuration at a common spherical radius of the fixed and rotatable race means 114 and 136, as well as serving to indicate the positioning of the frusto-conical roller pairs 157 and 159 relative thereto, for an exemplary device that includes 8 teeth in the rotatable race 136, 10 teeth in the fixed race 114 and 9 frusto-conical roller pairs 157 and 159 mounted on the ring member 144. As generally indicated thereon by the dotted lines 164, the path taken by a particular point on the periphery of the ring member 144, such as the axis of rotation of one of the frusto-conical rollers 157, during a 360° revolution of the input shaft 120 is a sinusoid. As also indicated thereon, the path taken by the axis of rotation of each of the frusto-conical roller pairs 157 and 159 as they interfacially engage and travel along the races is a compressed sinusoid, as depicted by the dotted line 166, and in which roller contact with each race is intermittent and hence of discontinuous character. As shown, each race pattern is formed of a plurality of equally spaced sharp tooth-like crests 160 separated by a recessed portion 162, with each of the latter defining a surface that is adapted to the disposed in effectively continuous interfacially engaged relation with the external surfaces of the frusto-conical roller pairs 157 and 159 to uniformly apportion the loading thereon. The composite shape of each such recessed portion is essentially the summation of curves that are parallel with and uniformly spaced from the sinusoidal path 166 taken by the axis of rotation of the conical roller pairs 157 and 159. Such shape provides large surface areas of low pressure angle contact with the roller pairs 157 and 159.

In this preferred embodiment, the base of the recessed portions 162 intermediate the tooth-like crests 160 are relieved over those areas where, as generally indicated at 170, the pressure angle markedly increases. Such relief involves a deepening of the base portion of the recesses, as indicated by the dotted lines 172, to effectively minimize, if not eliminate, interfacial contact between the surface of the frusto-conical roller pairs 157 and 159 with the race surfaces at such locations.

As is also shown on FIG. 5, the major portion of the defining walls of the recesses 162 closely approximate straight lines. Also shown thereon is the selective contact of the roller elements 157 and 159 with these defining walls. More specifically, it should be noted that contact between rollers 157 and fixed race 114 takes place on one side 210 of recesses 162 as the roller 157 moves toward the base of such recesses. After the roller 157 moves past the bottom of the recess and is displaced away therefrom, roller contact takes place on the other side 212 of the recesses 162. Conversely, contact between the rollers 159 and the movable race 136 as the roller 159 moves toward the base of the recesses 162 takes place on one side 310 of the recesses 162. After the roller 159 moves past the bottom of the recesses 162 and are displaced away therefrom roller contact takes place on the other side 312 of the recesses 162. If the rollers 157 and 159 as a group can be made to simultaneously be in contact with the race surfaces at all times, backlash is reduced to zero. Such adjustment is provided by the collars 123 and 125 as shown in FIG. 4. Such collar adjustment changes the elevation of the center of rotation 150 with respect to the races 114 and 136, thereby providing a means for preloading the rollers 157 and 159 into contact with the race surfaces with result of eliminating all backlash in the operation of the device. A similar adjustment may be made in the FIG. 1 embodiment by regulating the spacing between the ends of the extending peripheral flanges 18 and 34.

As evidenced by the illustrated and described system geometry, the angle of swash plate inclincation, through which the drive rollers 157 and 159 undulate, is selectively chosen so as to effect a spherical path amplitude which approximates or is even greater than the circumferential crest to crest distance around the races and which amplitude is much larger than was obtainable in the FIG. 1 embodiment, wherein such amplitude was limited by the requirement that the opposing tooth-like crests 60 must pass each other when at the same spherical radius. In this FIG. 4 embodiment such physical limitation has been removed. In conjunction with the foregoing it should be noted that the diameter of such frusto-conical roller pairs 157 and 159 should be selected so that they do not cut off or truncate a significant portion of the high slope surfaces adjacent the race tooth crests, which in this case are above a plane perpendicular to the axis of rotation 138 and which passes through the center of rotation 150.

In the operation of the above described device, the frusto-conical roller pair 157 and 159 are again advanced an integral fraction of a revolution for every 360° rotation of the input shaft 120. The angular advance or regression of the ring member 144 with respect to the stationary housing element 110 is, for each revolution of the input shaft 120, determined by the number of roller pairs 157 and 159. The fixed race 114 again forces the roller pairs 157 and 159 and the ring 144 to rotate at a speed which is equal to the input shaft speed divided by the number of roller pairs 157 and 159 employed. If the number of tooth-like crests or teeth 160 in the stationary race 114 is one more than the number of roller pairs 157 and 159, then the ring 144 will regress. In contradistinction thereto, if the number of such tooth-like crests or teeth 160 is one less than the number of roller pairs 157 and 159, then the ring 144 will advance.

The following table summarizes the permutations that are available in the practice of the FIG. 4 embodiment.

TABLE 2

| Teeth on Fixed Race | Teeth on Output Race | Ratio | Relative Output Rotation |
| --- | --- | --- | --- |
| N | N + 1 | −N + 1 | Opposite |
| N + 1 | N − 1 | −1/(1/(N − 1) −1/N) | Opposite |
| N − 1 | N + 1 | 1/(1/N − (1/(N + 1))) | Same |
| N | N − 1 | N − 1 | Same |
| N + 1 | N | −N | Opposite |

TABLE 2-continued

| Teeth on Fixed Race | Teeth on Output Race | Ratio | Relative Output Rotation |
|---|---|---|---|
| N − 1 | N | N | Same |

Where N = Number of rollers
(Note: Ratio expressions have not been algebraically simplified to show differential or subtractive operation of these devices).

Analysis of the foregoing permutation Table I and II shows that, in each instance, the number of tooth-like crests on the fixed and rotatable races always differ from each other and, in every case, are also either equal to or differ from the number of rollers employed by one.

As will also become apparent from detailed examination of Tables I and II, both of the illustrated embodiments provide, with appropriate selection of the number of teeth to be employed in the fixed and rotatable races, that the direction of output shaft rotation can be either the same or as opposite to the direction of input shaft rotation.

However, it should be further noted that, in the embodiment, the rotatable race 36 means always rotates in the same direction as that of the ring member 44. Therefore, the speed ratio obtainable from such type of construction is the result of the additive displacements of the ring 44 and the output race means 36 and are thus relatively small when compared to the number of rollers 56 on the ring 44. In contradistinction thereto, in the embodiment of FIGS. 4 and 5, the displacement of the rotatable race 136 relative to the ring 144 is always in a direction opposite to that of the ring 144 and hence results in a subtractive or differential displacement of the rotatable race 136 relative to the fixed race 114. Such relationship provides for speed change ratios of a magnitude far in excess of those obtainable with the construction of FIG. 1, while maintaining the same inherent efficiency of operation independent of the magnitude of transmitted torque. Practice of the invention thus provides an extremely wide range of speed change capability.

Having thus described my invention, I claim:

1. In speed change assembly,
    a rotatable drive shaft having a longitudinal axis,
    swash plate means disposed at a predetermined angle of inclination with respect to the longitudinal axis of said drive shaft and rotatable in conjunction therewith,
    an independently rotatable annular ring member journaled on the periphery of said swash plate means and having its axis of rotation intersecting the longitudinal axis of said drive shaft at a center of rotation,
    a plurality of equally spaced freely rotatable frusto-conical rollers mounted on the periphery of said annular ring member, said frusto-conical rollers having their axes of rotation intersecting said center of rotation and the extension apex of their exterior surfaces coincident with said center of rotation,
    fixed race means positioned to be engaged by the rollers on the periphery of said ring member having a race pattern including a predetermined number of equally spaced extending crests separated by selectively shaped recesses therebetween,
    said number of crests either equalling the number of rollers or differing from the number of rollers by one.

2. The speed change assembly as set forth in claim 1 wherein said crests are of elongate tooth-like character and each of said recesses have defining side walls disposed coincident with the locus of points tangent to the surfaces of said frusto-conical rollers as the annular ring member rotates about the axis of the drive shaft and the frusto-conical rollers oscillate sinusoidally in accord with the angle of inclination of the swash plate means.

3. The speed change assembly as set forth in claim 2 wherein said recess defining side walls are of a slope to afford a low pressure angle over the major portion of roller element contact therewith.

4. The speed change assembly as set forth in claim 3 wherein the base portions of said recesses are relieved to preclude high pressure angle roller contact therewith.

5. In a speed change assembly,
    a rotatable drive shaft having a longitudinal axis,
    swash plate means disposed at a predetermined angle of inclination with respect to the longitudinal axis of said drive shaft and rotatable in conjunction therewith,
    an independently rotatable annular ring member journaled on the periphery of said swash plate means and having its axis of rotation intersecting the longitudinal axis of said drive shaft at a center of rotation,
    a plurality of equally spaced freely rotatable frusto-conical rollers mounted on the periphery of said annular ring member, said frusto-conical rollers having their axes of rotation intersecting said center of rotation and the extension apex of their exterior surfaces coincident with said center of rotation,
    fixed race means positioned to be engaged by the rollers on the periphery of said ring member having a race pattern including a predetermined number of equally spaced extending crests separated by selectively shaped recesses therebetween,
    rotatable race means positioned to be engaged by the rollers on the periphery of said ring member having a second race pattern including a second predetermined number of equally spaced extending crests separated by a second set of selectively shaped recesses therebetween.
    said first and second predetermined number of crests being different from each other and either equalling the number of rollers or differing from the number of rollers by one.

6. The speed change assembly as set forth in claim 5 wherein said crests are of elongate tooth-like character and each of said recesses have defining side walls disposed coincident with the locus of points tangent to the surfaces of said frusto-conical rollers as the annular ring member rotates about the axis of the drive shaft and the frusto-conical rollers oscillate sinusoidally in accord with the angle of inclination of the swash plate means.

7. The speed change assembly as set forth in claim 5 wherein each of said recesses have side walls of a slope to afford a low pressure angle over the major portion of roller element contact therewith.

8. The speed change assembly as set forth in claim 7 wherein the base portions of said recesses are relieved to preclude high pressure angle roller contact therewith.

9. The speed change assembly as set forth in claim 5 wherein said fixed and rotatable race means are disposed in adjacent side by side relation.

10. The speed change assembly as set forth in claim 9 wherein said fixed and rotatable race means comprise surface portions of a common sphere having its center at said center of rotation.

11. The speed change assembly as set forth in claim 5 wherein said fixed and rotatable race means are disposed in parallel nested coalignment with each other.

12. The speed change assembly as set forth in claim 11 wherein said fixed and rotatable race means comprise surface portions of concentric spheres having a common center at said center of rotation.

13. The speed change assembly as set forth in claim 11 wherein said plurality of rollers includes a first set of freely and independently rotatable frusto-conical rollers selectively engageable with said fixed race means and a second set of freely and independently rotatable frusto-conical rollers selectively engageable with said rotatable race means.

14. The speed change assembly as set forth in claim 11 wherein said swash plate means comprises an angularly offset portion of said rotatable drive shaft.

15. The speed change assembly as set forth in claim 11 including counterbalancing means mounted in angularly offset relation on said drive shaft and independently rotatable with respect thereto.

16. A speed change assembly comprising
a rotatable drive shaft having a longitudinal axis,
swash plate means disposed at a predetermined angle of inclination with respect to the longitudinal axis of said drive shaft and rotatable in conjunction therewith,
an independently rotatable annular ring member journaled on the periphery of said swash plate means and having its axis of rotation intersecting the longitudinal axis of said drive shaft at a center of rotation,
a plurality of equally spaced sets of axially coaligned pairs of freely rotatable frusto-conical rollers mounted on the periphery of said annular ring member, said pairs of frusto-conical rollers having their axes of rotation intersecting said center of rotation and the extension apex of their exterior surfaces coincident with said center of rotation,
fixed race means positioned to be engaged by one of the rollers in each pair thereof on the periphery of said ring member having a first race pattern including a first predetermined number of equally spaced extending crests separated by a first set of selectively shaped recesses therebetween,
rotatable race means positioned to be engaged by the other roller in each pair thereof on the periphery of said ring member having a second race pattern including a second predetermined number of equally spaced extending crests separated by a second set of selectively shaped recesses therebetween,
said first and second predetermined number of crests being different from each other and either equalling the number of rollers or differing from the number of rollers by one,
said fixed and rotatable race means being disposed in parallel nested coalignment with each other and comprising the surface portions of concentric spheres having a common center at said center of rotation,
said extending crests of first and second race patterns being of elongate tooth-like character and said recesses having defining side walls disposed coincident with the locus of points tangent to the surfaces of said frusto-conical rollers as said angular ring member rotates about the axis of said drive shaft and are of a slope to afford a low pressure angle over the major portions of roller element contact therewith.

17. The speed change assembly as set forth in claim 16 wherein the base portion of each of said recesses disposed intermediate said crests are relieved to preclude high pressure angle roller contact therewith.

* * * * *